H. L. SMITH.
TRANSFORMER SECONDARY.
APPLICATION FILED MAY 24, 1916.

1,214,235.

Patented Jan. 30, 1917.

INVENTOR
Herbert L. Smith
BY
Townsend & Decker
ATTORNEYS

UNITED STATES PATENT OFFICE.

HERBERT L. SMITH, OF WESTERLY, RHODE ISLAND.

TRANSFORMER-SECONDARY.

1,214,235. Specification of Letters Patent. Patented Jan. 30, 1917.

Application filed May 24, 1916. Serial No. 99,517.

*To all whom it may concern:*

Be it known that I, HERBERT L. SMITH, a citizen of the United States, and a resident of Westerly, in the county of Washington and State of Rhode Island, have invented certain new and useful Improvements in Transformer-Secondaries, of which the following is a specification.

My invention relates to the construction of transformers for electric welding machines and has reference more particularly to the construction of the secondary thereof.

The object of my invention is to provide a secondary of minimum length and resistance and at the same time to secure a rigid and perfect guide whereby the secondary terminal carrying or applied to the work may be guided perfectly by a rectilinear movement and whereby further tendency of the parts to be welded to spring out of line when welding pressure is applied may be avoided.

To these ends my invention consists essentially in constructing the secondary in two parts the members of which comprise respectively a cylinder and a sleeve therefor fitted to one another and capable of rectilinear guided movement one upon the other, said members carrying respectively arms or extensions terminating in the workholders or other means whereby the work may be held and pressure applied thereto for butt welding or other kinds of electric welding requiring the application of heating current and pressure at the terminals applied to the work.

A further object of my invention is to secure the advantages and results hereinafter more particularly referred to.

The invention consists in the construction of secondary hereinafter described and then more particularly specified in the claims.

Figure 1:
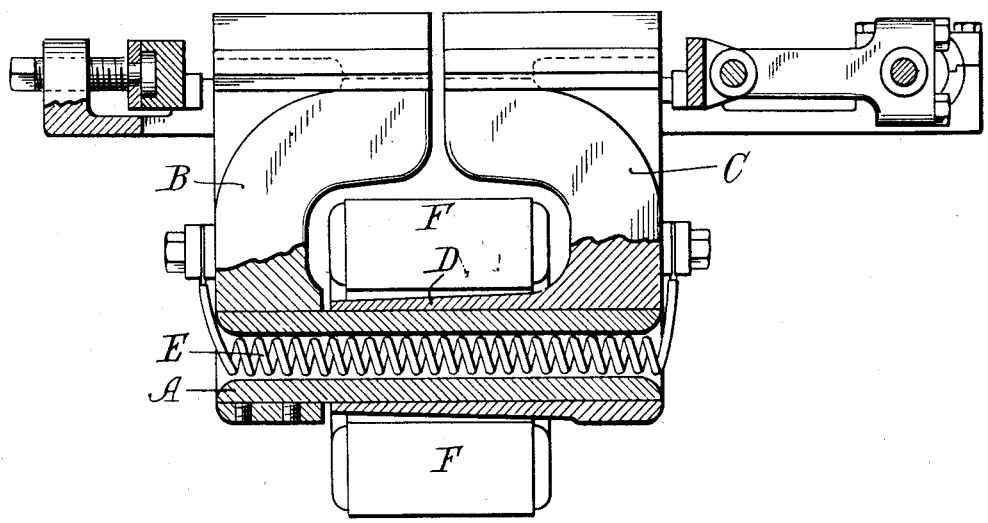
Figure 2:
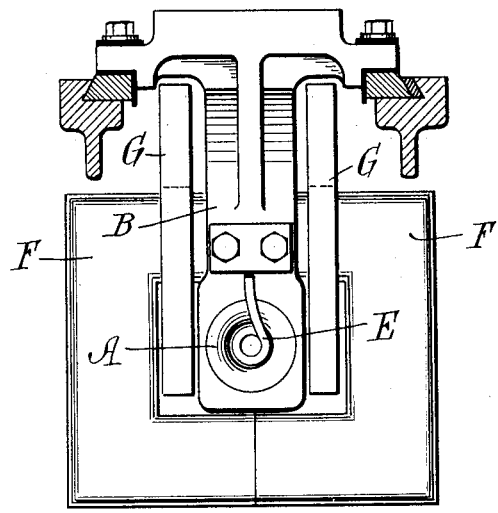

Figure 1 is a general side elevation of a form of electric welding machine shown as provided with a transformer whose secondary is constructed in accordance with my invention, the essential parts involved in the construction forming my invention being shown in longitudinal section. Fig. 2 is an end elevation of the machine.

A is a cylinder of drawn copper or other suitable material from one end of which extends an arm B whose terminal is furnished with any proper workholder or means for applying current and pressure to the work. Said workholder is here typified as one suitable for a butt welder and is provided with the usual means for mechanical adjustment. One of the pair of workholding clamps is mounted directly on said terminal. The other of the pair, assuming that the machine is organized for butt welding, is secured directly upon the opposite terminal of the secondary and carried by an arm or extension C extending from a sleeve or tube D closely and accurately fitted upon the cylinder A and so as to be capable of a rectilinear guided movement on the portion of said cylinder extending to the right from the arm B. The cylinder A is preferably made hollow, as shown, whereby passage is afforded for a cooling medium circulating through the same by the natural or artificial means. The passage also affords space for the copper cable bond E the ends of which are firmly secured to the two members of the secondary respectively preferably by clamping them, as shown, directly to the arms B, C. The said bond serves to avoid any possibility of arcing between the sliding contact surfaces of the cylinder and its sleeve D.

F indicates the usual iron core for the transformer and G the usual primary coils.

It will be understood that the arm C is suitably secured to the end of the sleeve D so as to form a permanent connection practically without resistance and in the same way that the arm B and cylinder are united. The arm C carries at its terminal a suitable workholding clamp for the portion of the work which requires to be advanced toward that held at the opposite terminal. The workholding clamp is fixed to the terminal of C without any intervening sliding action, the sliding and guiding support therefor being afforded by the sleeve D.

The usual or any suitable mechanical devices used in electric welders are attached or applied to the arm C for bringing the parts to be welded into contact and for applying pressure thereto in the welding operation. If desired further guides may be employed for guiding the work as indicated in the end elevation and as frequently employed in electric welders.

As will be seen, my improved construction whereby the sliding contact or connection is provided for the workholding terminal of the machine gives a great deal more contact area and consequently less wear than in the old type where a block carrying a workholding clamp slides upon the terminal of the secondary, while moreover my improved construction is simpler mechanically and there is less tendency for the parts to be welded to spring out of line when welding pressure is applied than is the case where the workholders are mounted upon slides guided upon the secondary terminal. In fact by my improved construction all joints and flexible connections are done away with excepting the close sliding fit between the cylinder and its sleeve which, by reason of their form may be very accurately made and may at the same time afford a great length of sliding bearing without increasing the length of the secondary. Furthermore, by locating this long sliding bearing within the field of the core where the current is generated, I secure much greater efficiency owing to the fact that the losses at the sliding contact are by this location practically eliminated and practically all of the sliding contact in the secondary circuit is confined to such location instead of being at the terminals of the secondary as in the previous constructions.

While I have described my invention more particularly with reference to its application to butt welding machines, it will be obvious that the essential features of my improved construction are not limited to use in that class of welders but may be applied, with suitable modification, in the appliances at the terminals of the secondary, to other classes of welding machines.

What I claim as my invention is:—

1. In an electric welding transformer, a two-part secondary the members of which comprise respectively a cylinder and a sleeve therefor capable of rectilinear guided movement one upon the other, said members having arms or extensions carrying respectively the work terminals of the machine which require to be moved one with respect to the other in the electric welding operation.

2. In an electric welding transformer, a two-part secondary the members of which consist respectively of a cylinder and a sleeve fitted thereon, one of said members being capable of rectilinear guided movement upon the other and said members carrying respectively arms upon which the workholders of the machine are mounted.

3. An electric welding transformer having a secondary comprising a hollow cylinder one end of which is provided with an extension carrying a workholder while the other end carries a sleeve fitted and guided on it and provided with an extension for the other workholder.

4. An electric welding transformer having a secondary comprising a hollow cylindrical bar within the field of the iron core of the transformer and having an arm secured to one end thereof, a sleeve fitted and guided on said cylinder and having an arm carrying the opposite terminal and a bond connected to said arms and passing through the hollow bar.

5. In a transformer secondary for electric welding machines, a cylindrical bar carrying one work terminal and a sleeve fitted and guided rectilinearly on said bar within the field of the core of the transformer and carrying the other work terminal.

Signed at Westerly, in the county of Washington and State of Rhode Island, this 20th day of May, A. D. 1916.

HERBERT L. SMITH.

Witnesses:
HARRY B. AGARD,
DELMORE W. STANTON.

Copies of this patent may be obtained for five cents each, by addressing the "Commissioner of Patents, Washington, D. C."